Nov. 14, 1933.　　　C. S. BROWN　　　1,935,110
ROLLER BEARING CONSTRUCTION
Filed June 1, 1932
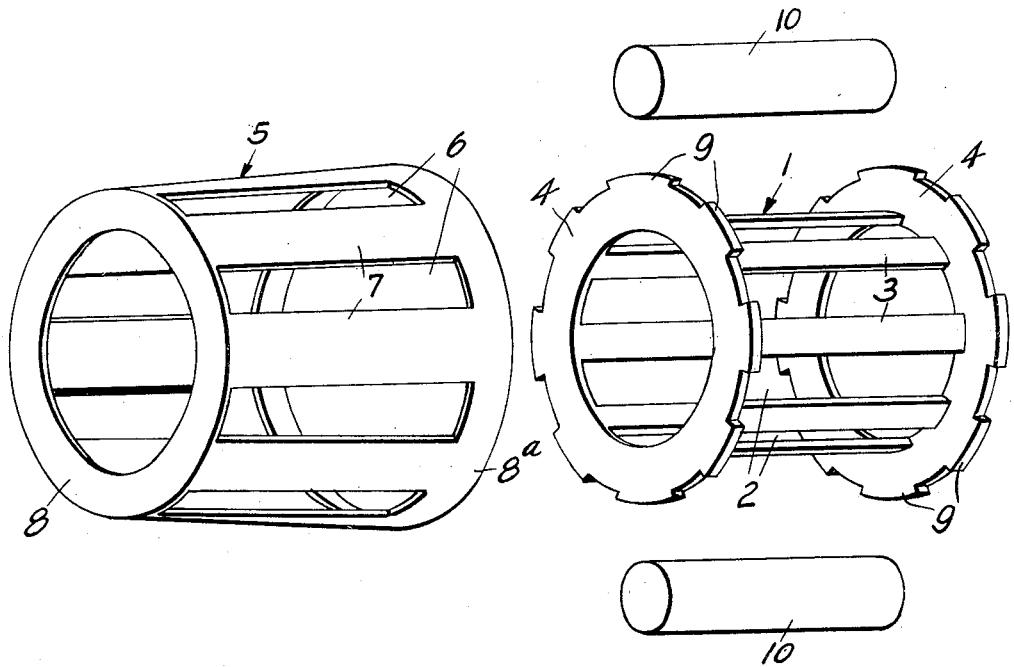
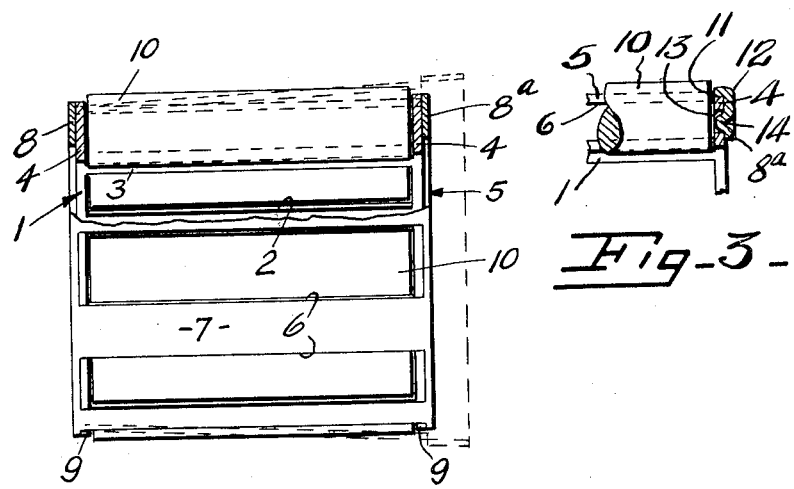
INVENTOR.
Charles S. Brown
BY
Bradell & Thompson
ATTORNEYS.

Patented Nov. 14, 1933

1,935,110

UNITED STATES PATENT OFFICE 1,935,110

ROLLER BEARING CONSTRUCTION

Charles S. Brown, Syracuse, N. Y.

Application June 1, 1932. Serial No. 614,755

2 Claims. (Cl. 308—217)

This invention relates to roller bearings and has for its object a roller bearing construction and particularly a cage construction by which the rollers and the cage are readily assembled and which is particularly economical and simple in construction and durable in use.

The invention consists in the novel features and in the combinations and constructions hereinafter set forth and claimed.

In describing this invention, reference is had to the accompanying drawing in which like characters designate corresponding parts in all the views.

Figure 1 is an exploded view of this bearing construction showing the parts before being assembled.

Figure 2 is an elevation, partly in section, of this roller bearing.

Figure 3 is a fragmentary detail view of a modified form.

This roller bearing comprises generally an inner cylindrical cage or cage section having roller receiving slots and external flanges at its ends, rollers projecting through the slots, and means, as an outer cage or cage section concentric with and spaced from the inner cage, for holding the rollers from outward displacement. The inner and outer cages or cage sections have interlocking means for holding them from axial displacement and from relative rotary movement.

1 designates the inner cage, which is cylindrical in general form and provided with roller receiving slots 2 leaving lengthwise bars or spacers 3 between the slots, the cage also having external annular flanges 4 at its ends.

5 designates the outer cage, which is also cylindrical in general form and is provided with lengthwise roller receiving slots 6 leaving spacer bars 7 between the slots and also with inwardly extending annular flanges 8, 8$^a$ at its ends, which lap the flanges 4 of the inner cage. Each cage is formed up of sheet metal and is preferably unitary or not split from end to end. The flanges 4 and 8 constitute interlocking means for preventing axial displacement of the inner and outer cages relative to each other.

The cages are preferably also provided with interlocking means for preventing relative rotary movement, and as here illustrated, the flanges 4 are provided with peripheral lugs 9 which enter or interlock with the end portions of the slots 6.

10 designates the rollers arranged between the cages or the cylindrical portions thereof, peripheral portions extending through the slots 2 and the opposite peripheral portions through the slots 6. The ends of the rollers abut against the inner faces of the flanges 4 of the inner cage and are not reduced or formed with axles.

As here illustrated and preferably the flanges or heads 4 of the inner cage are located on the inner sides of the flanges or heads 8, 8$^a$ of the outer cage; and in forming the bearing, the outer cage 5 is formed cup-shaped and slightly conoidal with the end flange 8 turned in at the end of the smaller diameter of the outer cage and the flange 8$^a$ at the larger end, unformed, or but partly formed; the rollers 10 are placed in the slots 2 of the inner cage 1; the inner cage 1 with the rollers 10 therein then inserted in the outer cage 5 through the larger end thereof with the lugs 9 interlocking with the ends of the slots 6, or in position to interlock therewith; and then the outer cage is pressed or drawn into cylindrical form with suitable tools or a machine for that purpose, and the flange 8$^a$ at the open end of the cage 5 turned or drawn inwardly onto the adjacent flange 4 of the inner cage. Thus, the two cages 1, 5 and the rollers 10 are securely held in assembled relation, the rollers being held in alignment by the spacing bars 3 and 7 and by the flanges 4.

As seen in Figure 3, the heads or flanges 4 may be unprovided with lugs 9, and in this case, the slots 6 of the outer cage terminate at 11 in planes flush with the inner faces of the heads or flanges 4 and the flanges 8, 8$^a$, when turned or spun over on the flanges 4 leave a rounded corner 12 over the edges of the flanges 4. In this construction, the inner and outer cages 1, 5 are held from relative turning by one or more indentations and projections 13, 14 in the end flanges 4 and 8, 8$^a$ thereof.

This roller bearing is particularly adapted for pilot bearings, such as are interposed between the drive shaft or stem gear, and the transmission shaft of the change-speed transmission gears of motor vehicles, and is particularly advantageous in that owing to its construction, the rollers are held in alignment and the bearing particularly durable and capable of withstanding hard usage, and further the rollers extend nearly the entire length of the bearing so that the bearing length of the rollers is practically the overall length of the bearing, or in other words, the effective length is nearly equal to the overall length.

What I claim is:

1. A roller bearing construction comprising an inner cylindrical cage formed with roller receiving slots and having outwardly extending annular flanges at its ends; an outer cage enclosing the inner cage and comprising a cylindrical body having roller receiving slots and inwardly extending annular flanges at its ends, lapping the annular flanges of the inner cage; and rollers between the cages and having portions projecting through the slots thereof; the inner flanges of the inner cage having peripheral lugs which interlock in the end portions of the slots of the outer cage.

2. A roller bearing construction comprising inner and outer concentric and cylindrical spaced apart cages, the inner cage being nested within the outer cage, said cages having annular flanges at their ends and roller receiving slots, the heads of one cage lapping those of the other, and holding them from axial and radial displacement, and also means for locating said cages with their roller slots in alinement, and rollers between the cages having portions projecting through the slots of both cages.

CHARLES S. BROWN.